United States Patent
Wright et al.

[15] 3,662,088
[45] May 9, 1972

[54] ELECTOSTATICALLY COATED LAMINATED BUS BAR ASSEMBLY

[72] Inventors: George E. Wright, Barrington; Leonard F. Wisniowicz, Wheaton, both of Ill.

[73] Assignee: Methode Manufacturing Corp., Rolling Meadows, Ill.

[22] Filed: Jan. 20, 1970

[21] Appl. No.: 4,244

[52] U.S. Cl. ........................ 174/72 B, 117/93.4 R, 118/500, 118/621, 156/275, 174/117 FF
[51] Int. Cl. ........................................................... H02g 5/00
[58] Field of Search .............. 174/72 B, 88 B, 117 FF, 129 B, 174/133 B

[56] References Cited

UNITED STATES PATENTS

| | | | |
|---|---|---|---|
| 1,999,137 | 4/1935 | Flewelling | 174/117 FF X |
| 3,400,303 | 9/1968 | Rowlands et al. | 174/72 B X |

FOREIGN PATENTS OR APPLICATIONS

| | | | |
|---|---|---|---|
| 111,150 | 6/1964 | Czechoslovakia | 174/72 B |

Primary Examiner—Laramie E. Askin
Attorney—Johnson, Dienner, Emrich, Verbeck & Wagner

[57] ABSTRACT

A multilayer, multiconductor bus bar or multilayer, multiconductor wiring panel with homogeneous insulation, bonding agent and encapsulant provided by simultaneous deposition of microscopic insulating compound to the electrically charged and heated conductors, —and method of manufacture.

1 Claim, 8 Drawing Figures

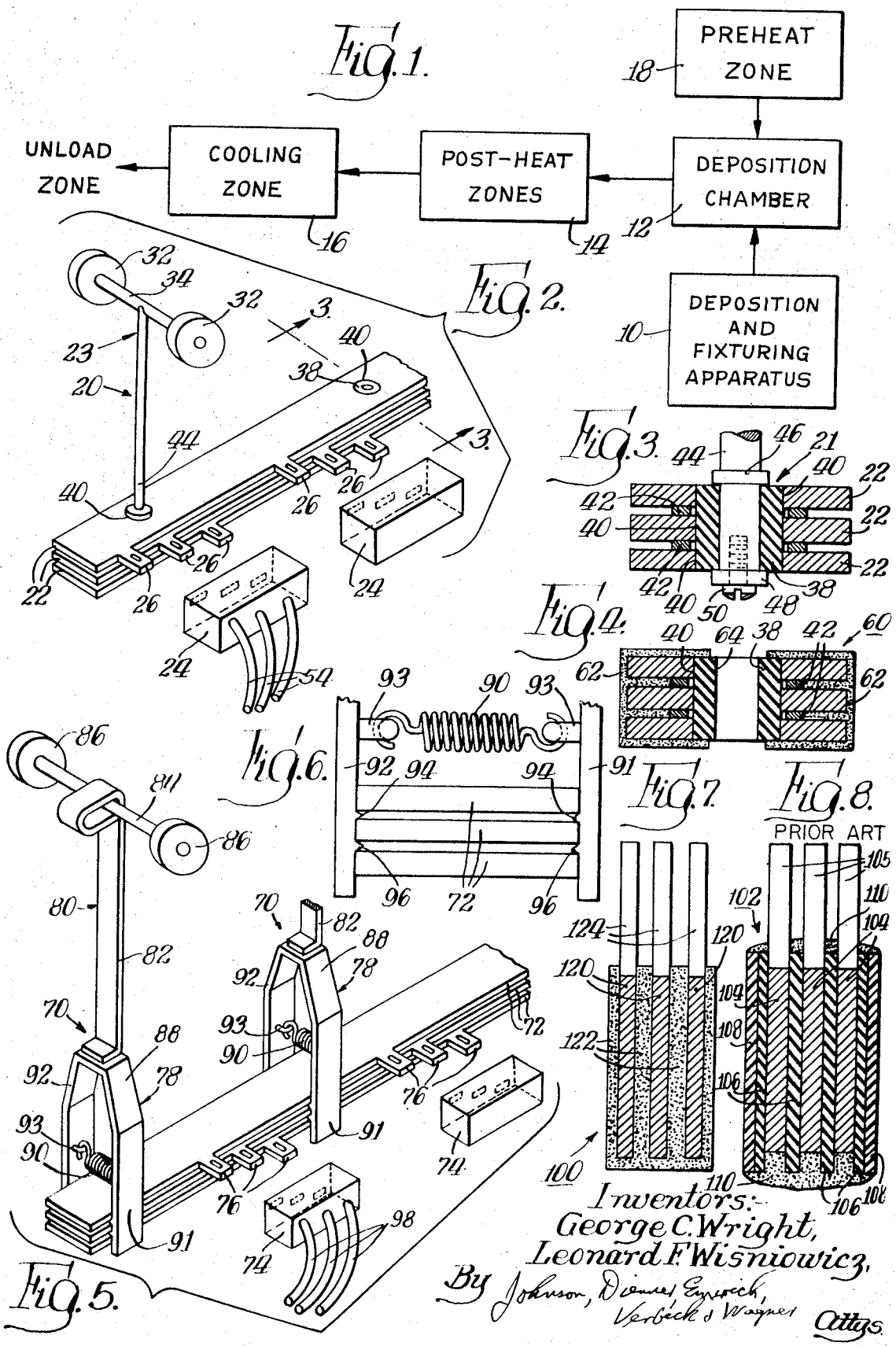

ELECTOSTATICALLY COATED LAMINATED BUS BAR ASSEMBLY

SUMMARY OF INVENTION

With the need for increasingly complex, high speed, high density, high current capacity, controlled impedance values for voltage and signal distribution systems, various new packaging concepts have evolved to replace harness or spaghetti circuits which are bulky because they consist of a plurality of individually insulated round conductors bundled and laced together. One of the new concepts is a multiconductor multilayer bus bar or multiconductor, multilayer wiring panel wherein the conductors are stacked vertically and insulated between and outside each conductor plane with individual insulating strips of dielectric material.

Such multilayer bus bar or multilayer panels have numerous advantages over the bulky wiring harnesses, such, for example, as a great reduction in space required—one-third that of the conventional wiring harness—ease and economy of installation, a variety of terminals, reduction of noise in high speed electronic switching systems, and high current carrying capacity with low voltage drop characteristics.

However, in such prior multilayer systems, the conductors, the interleaved insulating strips and the external insulating cover have been manually or mechanically fabricated and manually or mechanically layed together one unit at a time and bonded together using an adhesive agent under heat and pressure. To achieve an encapsulation of such bus bar or wiring panel system and to leave only the connecting terminals uninsulated, an encapsulating compound has been manually or mechanically applied to form a complete envelope around the prelaminated plurality of conductors and insulating strips. Such procedures are time consuming and therefore expensive and also have resulted, at times, in non-uniformity of product.

To overcome the limitations and disadvantages of such prior structures, we have conceived of a new discrete multiconductor, multilayer bus bar of multiconductor, multilayer wiring panel which has no manually or mechanically fabricated insulating strips manually or mechanically interleaved between conductor strips. The new structure comprises conductor strips which are initially supported as a group in a selected spaced relation and then are simultaneously insulated, bonded, and encapsulated both singularly and in plurality by deposition of microscopic particles of insulating compound to the conductor strips or conductor panels which are electrically charged and heated.

Thus we are able to duplicate the desirable features of the multiconductor, multilayer bus bars and multiconductor, multilayer wiring panels—which heretofore have been manually or mechanically fabricated and constructed using individual conductor strips or conductor panels, individual strips of dielectric material, and an envelope of a dissimilar encapsulating compound—while eliminating some of the undesirable features.

In its preferred form the multiconductor multilayer bus bar or multiconductor multilayer panel is a plurality of conductors which are initially supported as a group in a selected spaced relation and then are simultaneously insulated, bonded and totally encapsulated, while providing a plurality of uninsulated conductor tabs. A singular insulating compound is disposed between and on the exterior surfaces of the conductors except at the tabs. Uniformity in the application of such insulating compound is provided by depositing it in minute electrically charged particles on the heated conductors at ground potential. A major advantage is the elimination of dissimilar insulating strips, bonding agent and encapsulation compounds, that are individually applied manually or mechanically in multistage, time displaced sequence.

Another advantage resides in the ability to vary the system impedance of the assembly by varying the separation between conductors and/or the electrical charge and/or the temperature of the heated conductors.

Another advantage resides in the ability to improve the reliability of our improved structure through the elimination of manufacturing sequences.

Another advantage resides in the ability to reduce structural voids and insulation voids, through deposition of electrically charged microscopic insulating particles on heated plates at ground potential. Other objects, advantages, and uses will appear or be readily appreciated by one skilled in the art from the following description and from the drawings.

DRAWING DESCRIPTIONS

FIG. 1 is a diagrammatic flow chart of procedures for producing a multilayer, multiconductor bus bar assembly according to the present invention;

FIG. 2 is a perspective view of one type of deposition and fixturing apparatus;

FIG. 3 is a cross-sectional view taken along the line 3—3 of FIG. 2, with the addition of a partially shown fixture hanger;

FIG. 4 is a cross-sectional view identical to FIG. 3, after the deposition of electrically charged insulating particles and with the fixture hanger removed;

FIG. 5 is a perspective view of a second type of deposition and fixturing apparatus;

FIG. 6 is a partial end view of the left side of FIG. 5;

FIG. 7 is a cross-sectional enlarged view of a multilayer, multiconductor bus bar assembly made in accordance with the principles of this invention; and FIG. 8 is a view like that of FIG. 7 showing a prior form of a multilayer, multiconductor bus bar assembly.

MAIN DESCRIPTION

For convenience the invention will be illustrated in the form of a multilayer, multiconductor bus bar, but it will be understood that the invention may take other forms, for example, a multilayer, multiconductor wiring panel.

Referring to FIG. 1, there is shown a diagrammatic flow chart of one process for making a multilayer, multiconductor bus bar assembly according to the principles of this invention. A deposition and fixturing apparatus 10, including a plurality of spaced-apart electrical conductors, electrically charged to one polarity, is conveyed into a deposition chamber or station 12, where the spaced-apart electrical conductors are exposed to a cloud pattern of electrically charged insulating powder particles of the opposite polarity. The electrically charged insulating particles are attracted to the oppositely charged plate surfaces of the spaced-apart electrical conductors and deposited thereon. Following the deposition step, the deposition and fixturing apparatus 10 is conveyed to post-heat zones or stations 14, where the powder particles are first fused onto the surfaces of the spaced-apart electrical conductors and then cured thereon. Following the curing step, the deposition and fixturing apparatus 10 is delivered to a cooling zone or station 16 prior to being unloaded from the conveyor system.

It is often preferred to heat the deposition and fixturing apparatus 10 in an oven at preheat zone or station 18 prior to moving it in deposition chamber 12. It has been found by preheating the electrical conductors, it is possible to deposit a much thicker coat of charged powder particles for the same potential difference between the heated plates and charged particles.

The deposition chamber 12 has a semi-enclosed housing and its own air circulation system for collecting the unused electrostatically charged powder particles. An electrostatic powder hand gun assembly is used in the deposition chamber 12 to create a cloud pattern of electrostatically charged powder particles. A number of electrostatic powder hand gun assemblies are manufactured and sold by the Ransbury Electro-Coating Corporation, Indianapolis, Indiana.

Alternatively, the cloud pattern of electrostatically charged powder particles could be produced in a fluidized bed, which are manufactured by several companies—such as Electrostatic Equipment Corporation, Fairfield, Connecticut. In using a fluidized bed, an object to be coated is immersed in the cloud pattern created by the fluidizing method.

Because the construction and operation of electrostatic gun assemblies are well known in the art and form no part of this invention, a detailed description of the gun will not be given. Briefly, a hand-held gun unit has a rotating diffuser which when triggered sprays a cloud pattern of powder particles. The diffuser surface is maintained at a high positive voltage to give the powder particles an electrical charge as they pass through the rotating diffuser into the surrounding atmosphere.

When the gun is held with its diffuser adjacent to an object to be coated and this object is grounded, an electric field is established between the charged particles and the object. Under the action of this field, the charged powder particles are attracted to the surfaces of the object. The charged particles which deposit on the object are electrostatically held in place. As other arriving particles deposit and adhere in a similar manner, the point will be reached where an approaching particle will find the surface of the object charged to a certain magnitude of the same sign as itself, i.e., a charged field is created by the particles covering the surface of the object. Further deposition will stop under these conditions and the approaching particles will be repelled away.

There are two factors which determine the thickness of the deposited layers: the potential difference between the object and charged particles, and the temperature of the object. The following deposition characteristic chart will demonstrate the influence of these two factors in the formation of a multilayer, multiconductor bus bar assembly in accordance with the principles of this invention.

DEPOSITION CHARACTERISTIC CHART

| Voltage | Temp. | Thickness | K Factor* | Capacitance |
|---|---|---|---|---|
| 90,000V | Ambient | 2 mils | 6.5 | 725pf/in.$^2$ |
| 90,000V | 185°F | 10 mils | 6.5 | 145pf/in.$^2$ |
| 70,000V | 130°F | 4 mils | 6.5 | 360pf/in.$^2$ |
| 50,000V | 150°F | 6 mils | 6.5 | 240pf/in.$^2$ |
| 40,000V | 185°F | 8 mils | 6.5 | 180pf/in.$^2$ |

* 23° C - 1 KHz

By referring to the deposition characteristic chart, it can be appreciated that by preheating the electrical conductors of the deposition and fixturing apparatus 10 in the preheat zone 18 prior to its introduction in the deposition chamber 12, the thickness of the coating of powder particles can be dramatically increased. This thickness can also be increased by decreasing the potential difference between the electrostatically charged particles and the electrical conductors.

One reason for wanting to control the thickness of the coating is to select a desired capacitance between adjacent conductors, as represented by the last column of the deposition characteristic chart. It is, of course, necessary to control and select the impedance between conductors of a bus bar since they introduce an impedance input value to the electronic circuits to which they are connected. Thus, the ability to preselect the impedance between conductors is a very important and beneficial factor.

There is shown in FIG. 2, one embodiment of the deposition and fixturing apparatus 10 comprising two or more fixture devices 20 (only one being shown) which are positioned at spaced intervals along the length of electrical conductors 22 (three being shown) to hold the electrical conductors 22 in a fixed spaced, parallel relation, and two or more masking blocks 24 for shielding the electrical terminals 26 from being coated.

Each fixture device 20 consists of a clamping portion 21 and a hanger portion 23. To transport the deposition and fixturing apparatus 10, the upper end of hanger portion 23 is provided with a pair of rollers 32 rotatable mounted at the opposite ends of shaft 34 and adapted to ride on a pair of suitable tracks (not shown). It is obvious that other well-known carriage means could be used in place of rollers 32. To electrically insulate the deposition and fixturing apparatus 10 from the conveyor structure (not shown), the rollers 32 are constructed of an electrical insulating material.

As shown in FIG. 3, the clamping portion 21 includes an insulating bushing 38 snugly inserted through aligned circular openings 40 in electrical conductors 22 and insulating washers 42 which hold adjacent conductors 22 in a spaced apart relation. The clamping portion 21 is fastened to the lower tubular end 44 of hanger portion 23 between its annular shoulder 46 and a washer 48, and is held in place by threading screw 50 into an axial threaded opening at the bottom of tubular end 44.

It can be readily appreciated that the electrical conductors are held apart a fixed predetermined distance equal to the thickness of the insulating washers 42 and are electrically insulated from each other by virtue of the fact the bushings 38 and washers 42 are made of electrical insulating material, preferably a fiber material.

As previously mentioned, the masking blocks 24 shield the electrical terminals 26 of electrical conductors 22 from being coated. One of these masking blocks 24 serves the additional function of connecting the electrical conductors to a fixed voltage potential by means of three electrical wires 54 having their ends engaged by terminals 26 upon masking member 24 being fastened to the set of three terminals 26. Although the three wires 54 could be connected at their ends opposite from terminals 26 to any constant voltage potential they are preferably connected to ground potential for purposes of convenience and safety.

There is illustrated in FIG. 4, a cross-sectional view of a multilayer, multiconductor bus bar 60 made in accordance with the method of this invention and held together during the deposition, fusing and curing operations by two or more fixture devices 20. As can be seen, the deposition coating 62 completely covers the exposed surface areas of conductors 22. At the unload zone of FIG. 1, the lower tubular end 44 is unfastened and removed, leaving a mounting hole 64 for bus bar 60.

There is shown in FIG. 5, a second embodiment of the deposition and fixturing apparatus 10 comprising two or more fixture devices 70 positioned at spaced intervals along the length of electrical conductors 72 to hold the electrical conductors 72 in a fixed spaced, parallel relation, and two or more masking blocks 74 for shielding the electrical terminals 76.

Each fixture device 70 consists of a clamping portion 78 and a hanger portion 80. The hanger portion 80 has a vertical leg 82 whose upper end carries a drive shaft 84 and two insulating rollers 86 for supporting the clamping portion 78.

The clamping portion 78 has a U-shaped member 88 with a spring 90 biasing its arms 91, 92 inwardly towards each other for rigidly holding the electrical conductors in a fixed spaced apart relation. The opposite ends of the spring 90 are hung on two C-shaped hooks 93 to maintain spring 90 in a stretched condition. As clearly illustrated in FIG. 5, spring 90 presses the arms 91, 92 against the sides of electrical conductors 72 and a pair of upper and lower wedged spacer extrusions 94, 96 of the arms 91, 92 maintain the adjacent electrical conductors 72 in a fixed spaced-apart relation.

One of the masking blocks 74 has three electrical wires 98 to connect the terminals 76 to ground potential in the same manner as wires 54 (FIG. 2), the first embodiment of deposition and fixturing apparatus 10.

For comparison purposes, there is depicted in FIG. 7 a bus bar assembly 100 made in accordance with the principles of this invention and in FIG. 8, a bus bar assembly 102 typical of prior multilayer systems.

The prior art bus bar assembly 102 (FIG. 8) comprises three conductors 104, four interleaved insulating strips 106, and an external cover 108 which are each mechanically or manually layed together at one time and bonded together using an adhesive agent under heat and pressure. The bus bar assembly 102 is encapsulated by an encapsulating compound 110 applied across both ends to form a complete envelope around the prelaminated conductors 104 and insulating strips 106, leaving uninsulated conductor tabs 105 exposed for connection.

By contrast, the bus bar assembly 100 (FIG. 7) of this invention comprises three conductors 120 which are insulated, bonded and totally encapsulated by a singular insulating compound 122, such as an epoxy resin, while providing a plurality of uninsulated conductor tabs 124.

We claim:

1. A multilayer, multiconductor bus bar assembly having high current carrying capacity and low voltage characteristics comprising a plurality of elongated electrical conductors, at least one terminal extending from each of said conductors, a plurality of insulating bushings extending crosswise through openings formed at spaced points along the length of said conductors, a plurality of insulating washers disposed about said bushings and between said conductors to hold said conductors in a spaced apart relation, and a coating of dielectric material completely enclosing said electrical conductors, leaving said electrical terminals exposed and filling the space between said conductors, where the spacing between said conductors is selected to provide the desired high current capacity and low voltage characteristics.

* * * * *